(12) United States Patent
Feng et al.

(10) Patent No.: US 9,811,540 B2
(45) Date of Patent: Nov. 7, 2017

(54) COMPACT, CLUSTERING-BASED INDEXES FOR LARGE-SCALE REAL-TIME LOOKUPS ON STREAMING VIDEOS

(71) Applicant: NEC Laboratories America, Inc., Princeton, NJ (US)

(72) Inventors: Min Feng, Princeton, NJ (US); Giuseppe Coviello, Plainsboro, NJ (US); Srimat Chakradhar, Manalapan, NJ (US); Nitin Agrawal, East Brunswick, NJ (US); Yi Yang, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 27 days.

(21) Appl. No.: 15/088,452

(22) Filed: Apr. 1, 2016

(65) Prior Publication Data
US 2016/0299920 A1 Oct. 13, 2016

Related U.S. Application Data

(60) Provisional application No. 62/144,626, filed on Apr. 8, 2015.

(51) Int. Cl.
G06K 9/00 (2006.01)
G06F 17/30 (2006.01)
G06K 9/62 (2006.01)

(52) U.S. Cl.
CPC .. *G06F 17/30277* (2013.01); *G06F 17/30256* (2013.01); *G06K 9/00268* (2013.01); *G06K 9/00711* (2013.01); *G06K 9/6219* (2013.01); *G06K 9/6223* (2013.01); *G06K 9/6272* (2013.01)

(58) Field of Classification Search
CPC ............ G06K 9/6218; G06K 9/00268; G06K 9/6261; G06K 9/6276
See application file for complete search history.

(56) References Cited

U.S. PATENT DOCUMENTS

| | | | |
|---|---|---|---|
| 6,285,995 B1 * | 9/2001 | Abdel-Mottaleb | G06F 17/3025 707/737 |
| 2003/0161500 A1 * | 8/2003 | Blake | G06K 9/6255 382/103 |
| 2004/0019574 A1 * | 1/2004 | Meng | G06Q 10/10 706/15 |
| 2014/0040262 A1 * | 2/2014 | Winter | G06F 17/30778 707/737 |
| 2014/0063236 A1 * | 3/2014 | Shreve | G06K 9/00228 348/143 |
| 2014/0169673 A1 * | 6/2014 | Liu | G06F 17/30247 382/170 |

\* cited by examiner

*Primary Examiner* — Eueng-Nan Yeh
(74) *Attorney, Agent, or Firm* — Joseph Kolodka

(57) ABSTRACT

Systems and methods for recognizing a face are disclosed and includes receiving images of faces; generating feature vectors of the images; generating clusters of feature vectors each with a centroids or a cluster representative; for a query to search for a face, generating corresponding feature vectors for the face and comparing the feature vector with the centroids of all clusters; for clusters above a similarity threshold, comparing cluster members with the corresponding feature vector; and indicating as matching candidates for cluster members with similarity above a threshold.

10 Claims, 3 Drawing Sheets

COMPACT, CLUSTERING-BASED INDEXES FOR LARGE-SCALE REAL-TIME LOOKUPS ON STREAMING VIDEOS

This application claims priority to provisional application Ser. No. 62/144,626 filed on Apr. 8, 2015, incorporated herein by reference in its entirety.

BACKGROUND

Technical Field

The present invention relates to a video processing engine for facial recognition.

Description of the Related Art

Real-time video surveillance involves extraction of faces from every frame in the video streams. These faces are stored in a data store for subsequent querying (a watch-list application matches the face in the video stream against a collection of faces, also called watch-list, that is stored in a data store). To facilitate high-speed lookup of faces in the data store, it is beneficial to have an index data structure on top of the collection of stored faces. For a streaming system, it is desirable to have such an index in main memory. However, the size of the index usually grows linearly as the number of faces in the collection increase. A key challenge is to devise a new index structure such that the index not only enables sub-second look-ups, but it also either grows very slowly or remains almost constant size as the number of faces in the collection increases.

Conventional indexing methods are O(n) in space, where n is the number of entries in a collection. This is prohibitively expensive for large volumes of video data (millions of faces).

Existing indexing schemes are either all on-line, and hence in the critical path affecting performance, or all off-line, and hence do not provide up to date information affecting accuracy. The present invention aims to provide a tighter bound on index-size growth while maintaining accuracy and performance of lookups.

SUMMARY

Systems and methods for for recognizing a face are disclosed and includes receiving images of faces; generating feature vectors of the images; generating clusters of feature vectors each with a centroids or a cluster representative; for a query to search for a face, generating corresponding feature vectors for the face and comparing the feature vector with the centroids of all clusters; for clusters above a similarity threshold, comparing cluster members with the corresponding feature vector; and indicating as matching candidates for cluster members with similarity above a threshold.

Advantages of the preferred embodiments may include one or more of the following. The preferred embodiment makes it feasible to perform real-time queries on matching images on large numbers of video streams. In the absence of the preferred embodiment the system either has to be provisioned with large amounts of memory and CPU cores to sustain real-time response rates or resorts to process queries in an offline manner. Especially with continual growth of the image corpus, the system can no give sustained high performance while incurring a lower operating cost in terms of number of machines dedicated for indexing and lookups.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The preferred embodiment consists of a new index structure that is built on top of a collection of faces (or features). Our index structure allows for sub-second look-up times for large collection of faces. Furthermore, the size of our index structure is largely independent of the number of faces in the stored collection.

Figure 1:
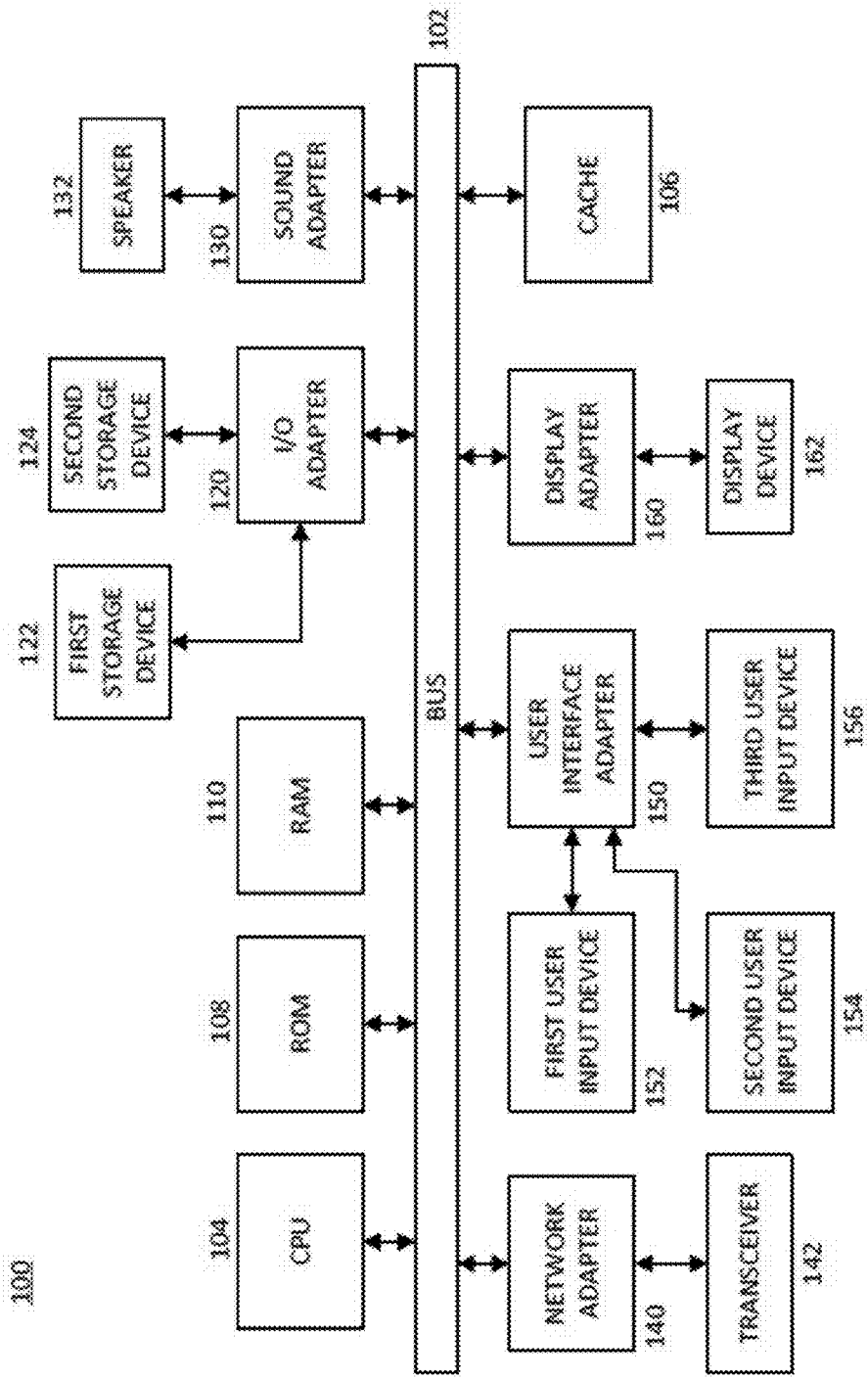
FIG. 1 shows an exemplary processing system to which the present principles may be applied, in accordance with an embodiment of the present principles.

FIG. 1 shows an exemplary processing system to which the present principles may be applied, in accordance with an embodiment of the present principles. The preferred embodiment builds a clustering-based index for features extracted from real-time video streams. The system clusters the faces in the collection into a pre-determined number of clusters by using an unsupervised clustering method (such as k-medoids). Every face is assigned to a unique cluster. Also, each cluster has a cluster centroid or a cluster representative. The size of the cluster model is sub-linear/logarithmic in the number of faces (or features) in the collection. Within each cluster, a collection of similar images is maintained in a separate data structure such as a tree. The mapping of incoming facial feature vectors to clusters is done in an off-line manner so as to improve accuracy and not affect foreground performance.

By maintaining a hierarchical index structure, the preferred embodiment substantially improves the latency of real-time look ups. At the time of the query, the feature vector of the query face is first compared to all cluster centroids to find similar ones. All images belonging to these cluster centroids are then compared to the query face. Images that match with a similar score above a pre-defined threshold are deemed as potential matches. Lookups are performed on-line to give results in real-time leveraging the off-line constructed index.

Indexing using k-medoids clustering allows the preferred embodiment to trade-off accuracy and performance of image lookups. The larger the number of clusters the more accurate the resulting match but with more in-memory space used for maintaining cluster information.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
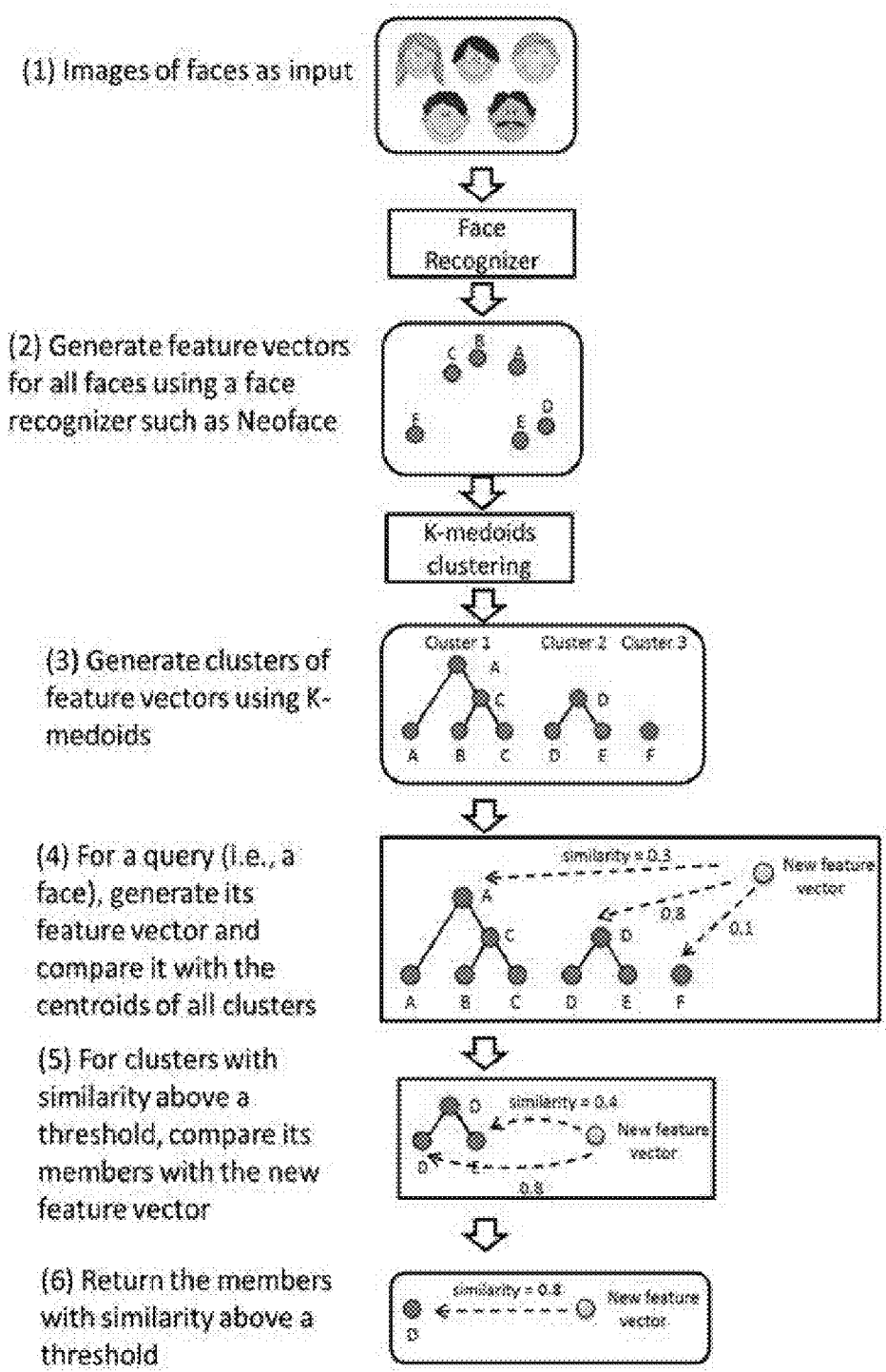
FIG. 2 shows an exemplary a high level flowchart of an exemplary image recognition system.

Further, it is to be appreciated that processing system 100 may perform at least part of the methods described herein including, for example, at least part of method of FIG. 2.

Referring now to FIG. 2, a high level flowchart of an exemplary image recognition system. First, images are provided as input (1). Next, feature vectors are generated for all faces using a face recognizer (2), such as Neoface recognizer. Through the utilisation of a unique matching face detection method, NeoFace provides high speed and high accuracy for facial detection and facial features extraction. NEC's face recognition relies on a modified Generalized Learning Vector Quantization (GLVQ) algorithm. GLVQ is not easily fooled by attempts to conceal identity through the usage of caps, hats or sunglasses. NeoFace can be implemented as a functionally independent application, or can be seamlessly integrated into new or existing biometrics security solutions.

The process then generate clusters of feature vectors using K-medoids, for example (3). For a query to search for a face, the process generates the feature vectors for the face and compare the feature vector with the centroids of all clusters (4). For clusters with similarity above a threshold, the process compare its members with the new feature vector (5) and returns members with similarly above a threshold.

The preferred embodiment proposes a hierarchical clustering-based index to store feature vectors of faces in video streams. The clustering index provides high-speed image lookups against a large and growing watchlist of known faces. The index also provides a pragmatic method to tune system accuracy and query response time through the number of cluster centroids and the corresponding size of the set of faces that belong to a given cluster.

Figure 3:
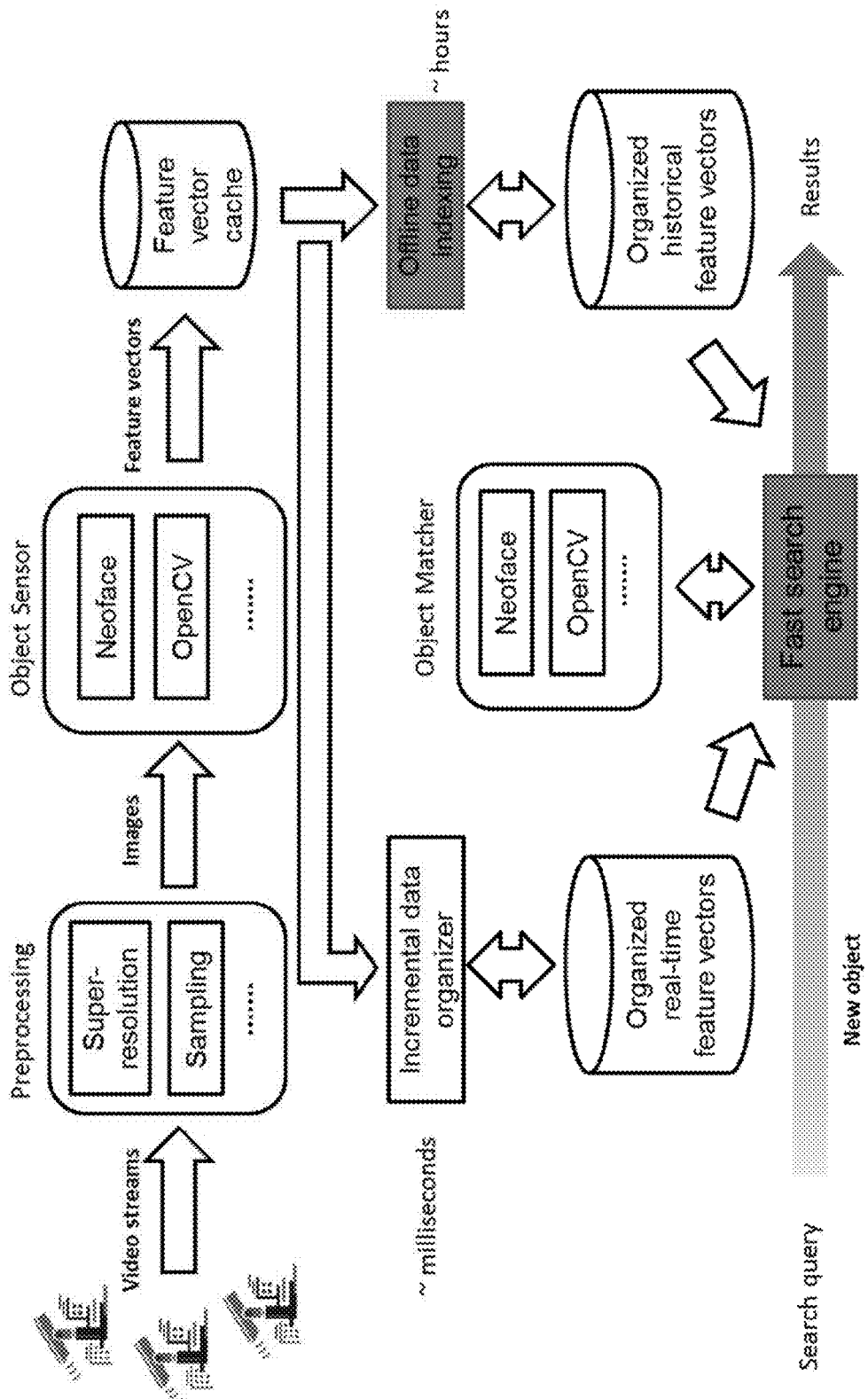
FIG. 3 shows a high level schematic of an exemplary image recognition system.

FIG. 3 shows a high level schematic of an exemplary image recognition system. In this system, surveillance cameras provide video streams to a pre-processor that captures super-resolution images and image sampling as needed. The images are sent to an object sensor that runs OpenCV and Neoface, among others to generate feature vectors that are saved by a feature vector cache. Data from the cache is provided to an incremental data organizer and stored in an organized real-time feature vector database. The cache data is also provided to an offline data sequencer that saves data in an organized historical feature vector database.

During operation, a search query is received by a search engine. The search engine accesses the organized real-time feature vectors, the historical feature vectors, and runs an object matcher to return matching results. The object matcher includes a face recognizer such as Neoface and libraries such as OpenCV, among others. OpenCV (Open Source Computer Vision Library) is an open source computer vision and machine learning software library. OpenCV was built to provide a common infrastructure for computer vision applications and to accelerate the use of machine perception in the commercial products. The library has more than 2500 optimized algorithms, which includes a comprehensive set of both classic and state-of-the-art computer vision and machine learning algorithms. These algorithms can be used to detect and recognize faces, identify objects, classify human actions in videos, track camera movements, track moving objects, extract 3D models of objects, produce 3D point clouds from stereo cameras, stitch images together to produce a high resolution image of an entire scene, find similar images from an image database, remove red eyes from images taken using flash, follow eye movements, recognize scenery and establish markers to overlay it with augmented reality, etc.

The preferred embodiment makes it feasible to perform real-time queries on matching images on large numbers of video streams. In the absence of the preferred embodiment the system either has to be provisioned with large amounts of memory and CPU cores to sustain real-time response rates or resorts to process queries in an offline manner. Especially with continual growth of the image corpus, the system can now give sustained high performance while incurring a lower operating cost in terms of number of machines dedicated for indexing and lookups It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system of apparatus or device or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for recognizing a face, comprising:
    receiving images of training faces;
    generating feature vectors of the images;
    generating clusters from the feature vectors each with one or more centroids or a cluster representative;
    for a query to search for a query face, generating query feature vectors for the query face and comparing the query feature vectors with the centroids of all clusters to find one or more similar clusters;
    for clusters above a similarity threshold, comparing feature vectors of corresponding members of the clusters with the query feature vectors; and
    indicating as matching candidates for cluster members with similarity above a threshold, wherein each cluster model size is sub-linear or logarithmic in the number of the training faces (or features) in a database.

2. The method of claim 1, comprising applying a clustering-based index for features extracted from real-time video streams.

3. The method of claim 1, comprising clustering the training faces into a pre-determined number of clusters with an unsupervised clustering method.

4. The method of claim 1, comprising clustering the training faces into a pre-determined number of clusters with k-medoids.

5. The method of claim 1, wherein each image of the training faces is assigned to a unique cluster.

6. The method of claim 1, wherein within each cluster, a collection of similar images is maintained in a separate data structure.

7. The method of claim 1, comprising mapping of facial feature vectors of received images to clusters in an off-line manner to improve accuracy and not affect foreground performance.

8. The method of claim 1, during query time, comprising comparing a feature vector of the query face to all cluster centroids to find similar ones.

9. The method of claim 1, wherein images belonging to cluster centroids are compared to the query face and images that match with a similarity score above a pre-defined threshold are deemed as potential matches and lookups are performed on-line to leverage an off-line constructed index and provide a real-time facial matching result.

10. The method of claim 1, comprising maintaining a hierarchical index structure to improve a latency of real-time look ups.

* * * * *